United States Patent [19]

Jensen

[11] 3,767,988
[45] Oct. 23, 1973

[54] MOTOR CONTROL CIRCUIT AND THREE-PHASE GENERATOR WITH STATIONARY COMPONENTS

[75] Inventor: Arne Jensen, Havnbjerg Als, Denmark

[73] Assignee: Danfoss A/S, Nordbog, Denmark

[22] Filed: Dec. 3, 1970

[21] Appl. No.: 94,934

Related U.S. Application Data

[62] Division of Ser. No. 755,190, Aug. 26, 1968, Pat. No. 3,597,638.

[52] U.S. Cl............... 318/227, 318/231, 321/9 A, 321/45, 321/DIG. 1, 307/228, 307/261
[51] Int. Cl. ............................................. H02p 5/28
[58] Field of Search................... 318/171, 227, 231; 321/45 R, 9 A, 61, 66, 69 R, DIG. 1

[56] References Cited
UNITED STATES PATENTS

| | | | |
|---|---|---|---|
| 3,331,003 | 7/1967 | King | 318/231 |
| 3,355,647 | 11/1967 | Braus | 318/171 |
| 3,125,694 | 3/1964 | Palthe | 307/228 |
| 3,444,394 | 5/1969 | Colvson | 307/261 |
| 3,089,992 | 5/1963 | Seney | 321/61 UX |

Primary Examiner—J. D. Miller
Assistant Examiner—Harvey Fendelman
Attorney—Wayne B. Easton

[57] ABSTRACT

An electrical three-phase generator and motor control circuit. The generator is made of three alike wave-generating units in cascade each generating a respective trapezoidal wave corresponding to a respective phase of the generator. Each unit comprises a small detector in series with a control circuit varying the amplitude of the wave proportionately to a control voltage representative of and corresponding to variations of voltage from voltage sources and applied to a motor and an integrating circuit consisting of an integrating amplifier and an integrating capacitor and a double limiter in parallel therewith. The control voltage is developed by a voltage divider across the motor control circuit.

4 Claims, 7 Drawing Figures

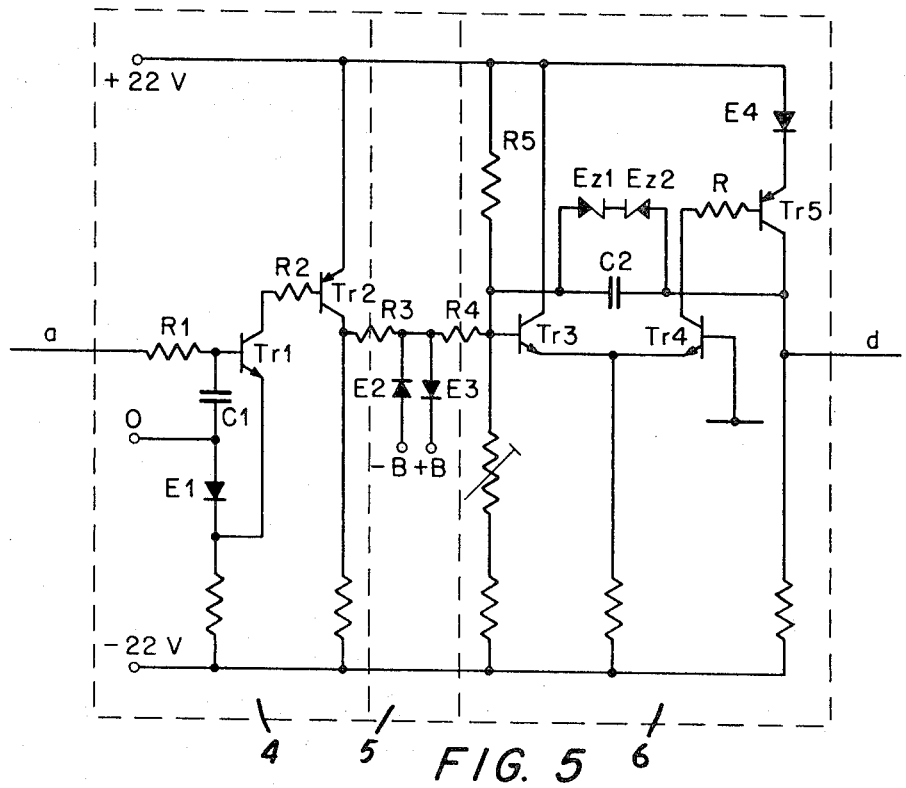
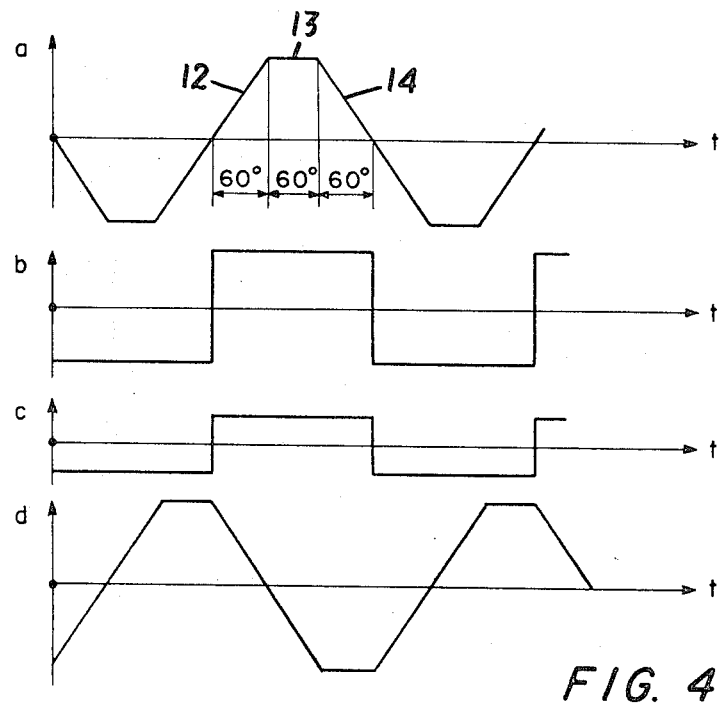
FIG. 5
FIG. 4

MOTOR CONTROL CIRCUIT AND THREE-PHASE GENERATOR WITH STATIONARY COMPONENTS

This is a divisional application of application Ser. No. 755,190 filed Aug. 26, 1968 now U.S. Pat. No. 3,597,638.

This invention relates generally to three-phase generators and more particularly to an electrical three-phase generator with stationary components.

Single-phase generators with stationary components for generating a sinusoidal voltage, are known. However, the employment of three such known sinusoidal voltage generators in combination or assembly to form a three-phase system presents difficulties. While it is possible to vary the frequency in known sinusoidal voltage generators, any variation of the frequency involves a transient period which increases the response time of the assembly.

A principal object of the present invention has for its object to provide a three-phase generator consisting of stationary components and nevertheless producing, as nearly as possible, the voltage characteristic of a rotary three-phase generator (sinusoidal, instantaneous combined voltages equal to zero) and enabling a simple, rapid variation of frequency, and also within the range of industrial alternating voltages from 5 to 100 Hz or cycles per second.

This object is achieved by the invention in that the half-waves of the individual phases are trapezoidal waveshapes and the three straight sections of the trapezium each have a duration of 60 electrical degrees.

In this way advantage is taken of the fact that trapezoidal half-waves, especially in the lower frequency region, can be generated more easily than sinusoidal waves when using stationary components. The trapezoidal characteristic claimed by the invention has the advantage over any other trapezoidal waveshape that, in a three-phase system, the resulting instantaneous summation voltage is always zero. The waveshape is so nearly sinusoidal that the third harmonic (as well as any other harmonic divisible by 3) is eliminated and merely the inconsiderable 5th, 7th, 11th etc., harmonics of small amplitude need to be taken into account (for the $n$th harmonic, with the factor $n^{-2}$). The amplitude of the relevant fundamental frequency is larger by 5 percent than the amplitude of the trapezoidal characteristic so that this 5 percent is available for the compensation of diode, filter etc. losses if a sinusoidal wave is to be represented.

This trapezoidal characteristic in which the three straight sections each have the same duration allows frequency to be varied very easily. All that has to be done is to vary the slope of the edges while maintaining the amplitude of the trapezoidal half-wave.

In a preferred circuit arrangement of the three-phase generator three wave-generating units are connected in series or cascade in a loop. Each of the three units, in dependence on the sign of the trapezoidal wave of the preceding unit, generates a square wave of constant but preferably controllable amplitude in phase therewith and then integrates this square wave and clips the integrated signal on either side to a constant amplitude. This results in a closed system in which the first unit drives the second unit, the second unit drives the third unit, and the third unit drives the first unit. In this way, not only the correct phase position of the several half-waves becomes fixed, but also the duration of all the straight portions of the trapeziums or trapezoidal waveshapes. The amplitude of the square wave determines frequency because it controls the slope of the trapezium waveforms during integration. According to a modified concept it would also be possible to use, instead of a square wave in phase with the signal, a 180° phase-displaced square wave, provided that an even number of such phase reversals occurs within the loop. In order to alter the frequency, the controllable amplitude of the square wave must be set to the same value in all units in a common operation. Since this is done simultaneously in the relevant locations of the system, transient phenomena do not occur.

In a practical embodiment of the invention each unit comprises, in series, a null detector with a preferably high amplification and an input signal in phase with the output signal, as well as an integrating amplifier the integrating capacitor of which is in parallel with a double-ended or double limiter circuit. Between the null detector and the integrating amplifier may be provided a double-ended limiter for the amplitude of the square wave which should however be adjustable by means of a direct current voltage. In this way, the frequency of the generator may be changed simply by varying a direct current voltage.

It is known that when controlling induction motors the torque remains constant if the frequency and motor voltage vary proportionally to one another. Up to now it was very difficult to fulfill this condition. With a generator according to the invention, on the other hand, it is sufficient to vary the amplitude of the square wave in proportion with motor voltage because the frequency is proportional to the amplitude. Since the amplitude, in turn, can be varied in the invention by means of a direct current voltage, all that is necessary is for this direct current voltage to be proportional to the motor voltage.

For example, an arrangement can be made in which an asynchronous motor driven with a pulsating direct current is controlled by a direct voltage which is applied to a square wave amplitude-limiting circuit and proportional to the motor supply voltage and the generator frequency controls the periodic on-off switching or change-over of the supply voltage. By way of modification, the direct voltage applied to the limiter may proportionally control frequency as well as supply voltage.

The applications of the generator of the invention are numerous. It can be employed wherever a three-phase system, especially a variable-frequency system, is needed. It primarily serves for motor control in which case the three-phase voltage is directly applied to the motor or is used for controlling the motor supply voltage. It is not essential for the trapezoidal voltages to be derived from all three outputs. In many cases only one phase will be used, for example when a single-phase alternating voltage with easily variable frequency is desired.

Other features and advantages of the three-phase generator in accordance with the present invention will be better understood as described in the following specification and appended claims, in conjunction with the following drawings, in which:

FIG. 4, is a diagram of the signal voltage characteristics or waveforms, plotted against time, produced by the unit of FIG. 3;

FIG. 5, is a circuit diagram of an embodiment of a unit according to FIG. 3;

Figure 1:
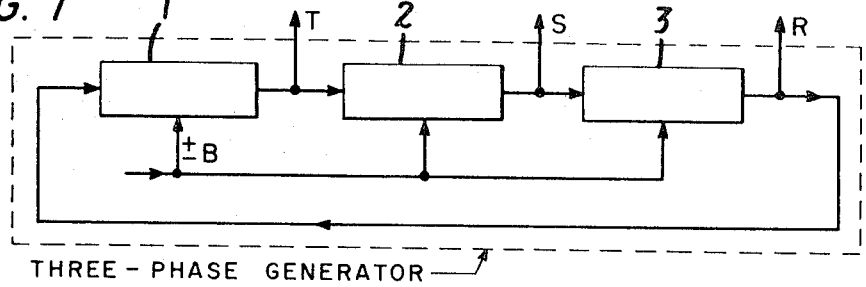
FIG. 1, is a block diagram of a three-phase generator according to the invention.
Figure 2:
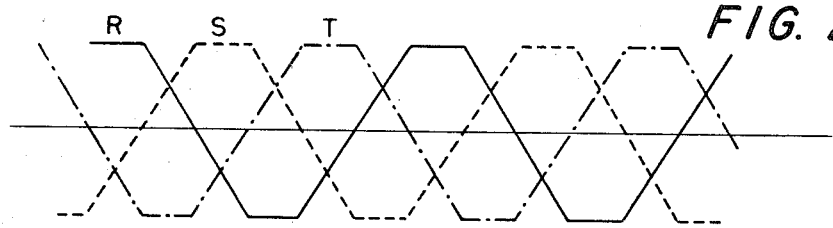
FIG. 2, is a diagram of the phase voltages generated by the generator of FIG. 1.

According to the drawing FIG. 1 shows a three-phase generator of the invention which comprises three identical wave-generating units 1, 2, 3 at the outputs of which appear output phases R, S and T in reversed sequence. The output of the preceding unit always constitutes the input of the following unit, and thus also the output of unit 3 constitutes the input of unit 1. A control signal ± B can be simultaneously applied to all three units and is preferably a direct-voltage pulse. FIG. 2 illustrates the shape and position of the phase voltages R, S, T thus produced.

Figure 3:
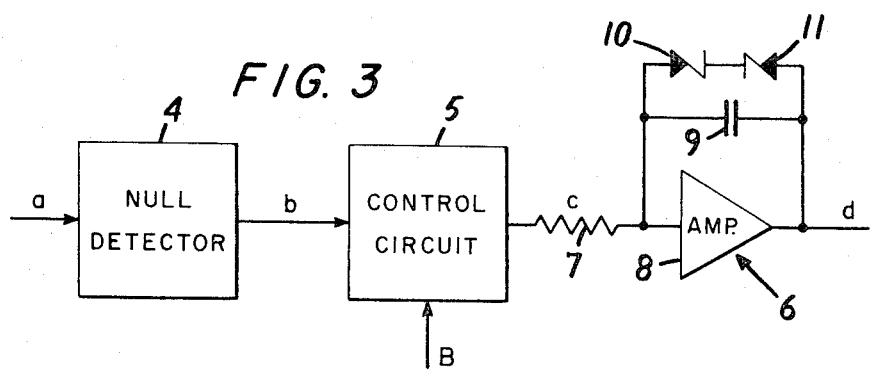
FIG. 3, is a block diagram of a wave-generating unit in the three-phase generator of FIG. 1.

Each of these waveform-generating units is constructed as shown diagrammatically in FIG. 3 in which only one of the units is illustrated. An input signal $a$, i.e., the output signal of the preceding unit, is applied to a null detector 4 providing high amplification. The resulting output signal $b$ is a square wave in phase with the initial signal which is applied to a control circuit 5 in which the amplitude of the square wave $b$ can be varied by means of the control signal ±B. An output signal $c$ thus produced by the control circuit 5 is applied to an integrator 6 comprising an integrating resistor 7 in series with a parallel circuit consisting of an amplifier 8, an integrating capacitor 9 and two voltage limiters 10, 11 preferably constructed as Zener diodes, series-connected back to back. The output signal $d$ of the parallel circuit will then be a trapezoidal wave of the same shape as the input signal $a$, but phase-displaced by 240°.

FIG. 4 illustrates the characteristics or waveshapes of the signals a-d, plotted against time on a baseline. Each of the trapezoidal half-waves comprises three straight sections, i.e., a rising slope or leading edge 12, the constant amplitude 13 and a falling slope or trailing edge 14. Each of these three sections extends over an electrical angle of 60°. The given duration of these 60° sections or periods depends, of course, on the frequency of the signal and decreases as frequency rises. The null detector 4 merely ascertains the sign of signal $a$, so that a square wave $b$ of standard amplitude is the result. This amplitude may be varied in the control circuit 5 by means of the control signal B, as can be seen by regarding signal $c$. As the square wave is integrated in the amplifier 6, the falling slope 14 and the rising slope 12 of a trapezoidal wave are produced. When the threshold of the voltage limiter 10, 11 is attained, integration stops and the amplitude 13 of the trapezoidal wave is kept at a constant value for the duration of 60 electrical degrees. Then the square wave $c$ changes its sign and the cycle commences again in the opposite direction. If this process is repeated for all three wave-forming units, then the trapezoidal voltage applied to the first unit will just be at the proper level to drive the first unit.

If the control signal B in the control unit 5 is used to vary the amplitude of signal $c$, the steepness of the slopes 12 and 14 is changed. Due to the loop arrangement of the three wave-forming units and to the simultaneous influence on all signals $c$ the condition is fulfilled that the sections 12, 13 and 14 always retain the same duration, the system reverts to another frequency attained immediately after a change of signal B, without any transient phenomena.

FIG. 5 is a circuit diagram for one such wave-forming unit. The unit is supplied with +22 volts and −22 volts as illustrated and comprises an input for the signal $a$, an output for the signal $d$ and a control input for voltages +B and −B. The signal $a$ is applied to an amplifying zero level detector comprising two galvanically coupled complementary transistors Tr1 and Tr2. The signal $a$ is applied to the base of the transistor Tr1 through a resistor R1. The collector of this transistor Tr1 is connected through a resistor R2 to the base of the following transistor Tr2. In order to safely establish zero level, the base-emitter path of the input transistor is connected through a diode E1 to a reference zero potential, in this case the mid-point of a current supply for the generator, not shown in FIG. 5 but shown in FIGS. 6 and 7. This circuit arrangement also serves for thermal stabilization. A capacitor C1 filters out high-frequency oscillations. The output signal from the second transistor Tr2 is the square wave $b$.

The control circuit 5 in this case is a simple limiter. Between two series-connected resistors R3 and R4 two oppositely connected diodes E2 and E3 are branched off to which the variable control voltage −B and +B is applied. These diodes begin to conduct as soon as the amplitude of the square wave $b$, the output of the null detector, exceeds the level of the control voltages ±B. The square wave $c$ at the limiter output is therefore a signal of reduced amplitude.

The resistor R4 is also the input resistor of the integrator 6. The integrator comprises a differential amplifier 8 the input section of which consists of a transistor Tr3 whereas its output section comprises two complementary transistors Tr4 and Tr5. The latter transistors are interconnected through the resistor R6. The base of the transistor Tr4 is connected to the common reference level of the system and a diode E4 is provided in the emitter circuit of the output transistor Tr5. From the collector of the output transistor Tr5 the signal is fed back through an integrating capacitor C2 to the base of the transistor Tr3. The Zener diodes Ez1 and Ez2, series-connected back to back, correspond to the diodes 10, 11 and are in parallel with the integrating capacitor C2 which corresponds to the integrating capacitor C9. This limits the voltage across the integrating capacitor C2 and produces the sections 13 of each trapezoidal half-wave.

Figure 6:
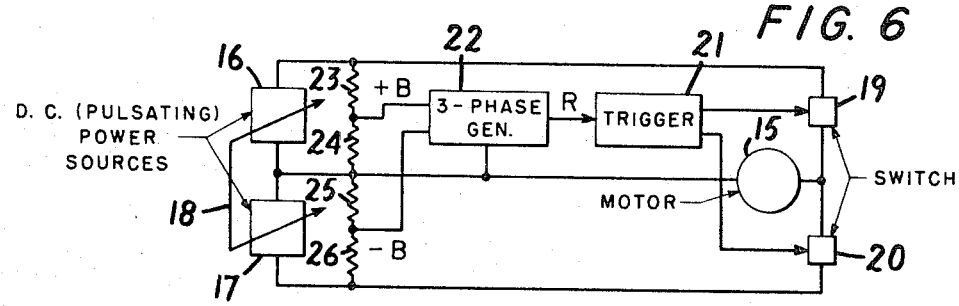
FIG. 6, is a control circuit for an electric motor employing a generator of the invention.

In the circuit arrangement of FIG. 6 an asynchronous motor 15 is supplied alternately with pulsating direct current from a positive voltage source 16 and a negative voltage source 17. The voltage of these two sources is controlled by a common unit 18 illustrated diagrammatically. Switching of the voltage is effected by means of two switches 19, 20, alternately operated by a trigger 21. This trigger is controlled by a generator 22 such as proposed by the present invention, only one phase of this generator is illustrated being used. The two voltage sources are each shunted by one potential divider comprising resistors 23, 24 and 25, 26 respectively. The control voltage +B and −B for the generator 22 is tapped from the junctions of the potential dividers as illustrated. The control voltage B varies proportionally with the motor supply voltage. Since the frequency of the output signal of generator 22 also varies proportionally with the level of the control voltage B, the switching frequency of switches 19, 20 varies proportionally with the motor supply voltage, so that the motor maintains a constant torque at every speed.

Figure 7:
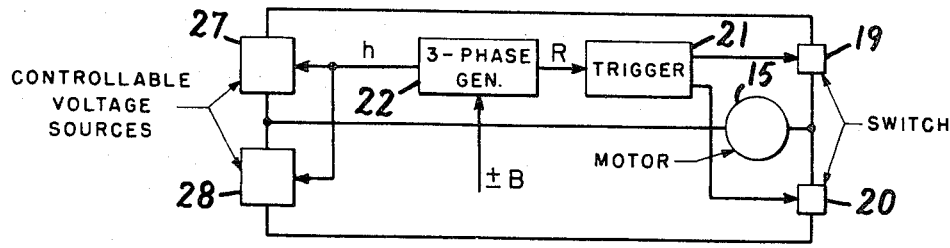
FIG. 7, is another control circuit employing the generator of the invention.

In FIG. 7 the same reference symbols as in FIG. 6 have been used for identical components. The essential difference is that the control signal B is here used not only for controlling the switching frequency of switches 19, 20, but also for controlling the supply voltage. For this purpose, a signal $h$ proportional to the control voltage B, is derived from the generator 22 which influences two controllable voltage sources 27, 28 in the appropriate manner.

While preferred embodiments of the invention have been shown and described it will be understood that many modifications and changes can be made within the true spirit and scope of the invention.

What I claim and desire to be secured by Letters Patent is:

1. In combination in a motor control circuit for an induction motor, an induction motor, voltage sources energizing said motor, means developing a control voltage varying proportionately to variations of the voltage from said sources applied to said motor, means comprising a three-phase generator under control of said control signal generating three waves each comprising positive and negative half-waves each having a trapezoidal waveform, and means applying the half-waves to said motor to control its torque and maintain it substantially constant regardless of variation of the voltage from said sources, said three-phase generator including (1) three wave-generating units in cascade with each unit including a null detector, (2) a control circuit receptive of said control signal and in series with said null detector, and (3) an integrating circuit receptive of the output of said control circuit, said trapezoidal waveform comprising three sections with each said section having a duration of 60 electrical degrees.

2. The combination according to claim 1, in which said integrating circuit comprises an integrating amplifier, an integrating capacitor in parallel with said amplifier, and a double limiter across said amplifier in parallel with said capacitor.

3. The combination according to claim 2, in which said double limiter comprises two zener diodes connected back to back.

4. The combination according to claim 1 in which said null detector comprises two series transistors, one of said transistors having an output collector, said amplifier comprising an input transistor having a base and an output transistor, two resistors connecting said output collector to said base of said input transistor, two parallel diodes connected in opposite polarity at junctions between said resistors, said double limiter comprising two zener diodes connected back to back across said amplifier.

* * * * *